US005742626A

United States Patent [19]
Mead et al.

[11] Patent Number: 5,742,626
[45] Date of Patent: Apr. 21, 1998

[54] ULTRAVIOLET SOLID STATE LASER, METHOD OF USING SAME AND LASER SURGERY APPARATUS

[75] Inventors: Roy D. Mead, Seattle; Charles I. Miyake, Kirkland; Dennis D. Lowenthal, Edmonds, all of Wash.

[73] Assignee: Aculight Corporation, Bellevue, Wash.

[21] Appl. No.: 689,820

[22] Filed: Aug. 14, 1996

[51] Int. Cl.$^6$ ............................... H01S 3/10; G02F 1/35; A61B 17/36

[52] U.S. Cl. ................... 372/22; 372/20; 372/21; 372/23; 359/326; 359/328; 359/330; 606/3; 606/4; 606/5; 606/10

[58] Field of Search ............................. 372/20, 21, 22, 372/23, 29, 39, 40, 69, 70; 359/326, 328, 329, 330; 606/4, 5, 10, 13, 17, 3

[56] References Cited

U.S. PATENT DOCUMENTS

| | | |
|---|---|---|
| 3,934,154 | 1/1976 | Cook, Jr. ............................. 307/88.3 |
| 5,144,630 | 9/1992 | Lin ...................................... 372/22 |
| 5,216,681 | 6/1993 | St. Pierre et al. ................... 372/22 |
| 5,260,953 | 11/1993 | Rowe .................................. 372/20 |
| 5,281,211 | 1/1994 | Parel et al. .......................... 606/5 |
| 5,312,320 | 5/1994 | L'Esperance, Jr. ................. 606/5 |
| 5,343,485 | 8/1994 | Okazaki .............................. 372/22 |
| 5,363,388 | 11/1994 | Shi et al. ............................ 372/20 |
| 5,408,481 | 4/1995 | Scheps ............................... 372/22 |
| 5,423,801 | 6/1995 | Marshall et al. .................... 606/5 |
| 5,430,754 | 7/1995 | Suzuki et al. ...................... 372/92 |
| 5,457,707 | 10/1995 | Sobey et al. ....................... 372/20 |
| 5,477,378 | 12/1995 | Johnson ............................. 359/326 |
| 5,579,152 | 11/1996 | Ellington et al. ................... 359/330 |
| 5,633,883 | 5/1997 | Shi et al. ............................ 372/20 |

OTHER PUBLICATIONS

Borsutzky et al., "Harmonic and Sum–Frequency Generation of Pulsed Laser Radiation in BBO, LBO and KD*P," *Appl. Phys.*, 52:55–62 (1991).

Borsutzky et al., "Tunable UV Radiation at Short Wavelengths (188–240 nm) Generated by Sum–Frequency Mixing in Lithium Borate," *Appl. Phys.*, 52:380–384 (1991).

Lublinski et al., "Collinear and Non–Collinear Sum Frequency Mixing in β–BBO for a Tunable 195–198 nm all–solid–state Laser System," *Appl. Phys.*, 61:529–532 (1995).

*Primary Examiner*—Brian Healy
*Attorney, Agent, or Firm*—Townsend and Townsend and Crew LLP

[57] ABSTRACT

A solid state laser system producing coherent radiations at deep ultraviolet wavelengths includes a solid state laser producing a first beam having a wavelength near 1 micron. The 1 micron beam is passed to both a harmonic generation stage and to a tunable optical parametric oscillator. The harmonic generation stage is configured to produce a fifth harmonic of the 1 micron beam, while the optical parametric oscillator produces a tunable beam in the near infrared spectrum (e.g., approximately 2.075 micron). The fifth harmonic and the near infrared beams are mixed in a sum frequency generator to produce a highly coherent beam in the deep ultraviolet (e.g., between approximately 180 nm to 213 nm).

27 Claims, 7 Drawing Sheets

ULTRAVIOLET SOLID STATE LASER, METHOD OF USING SAME AND LASER SURGERY APPARATUS

BACKGROUND OF THE INVENTION

The present invention relates to solid-state lasers. In particular, the present invention relates to the use of solid-state lasers to produce coherent radiations at ultraviolet wavelengths.

Lasers are used in many applications, from laser surgery to photolithography. A number of applications require the use of coherent radiations at ultraviolet wavelengths. The absorption coefficient for most materials is much greater for ultraviolet wavelengths than for visible and near-infrared wavelengths. Thus, laser beams produced at ultraviolet wavelengths, especially deep ultraviolet wavelengths between approximately 180 nm to 213 nm, are absorbed over a much shorter depth, thereby producing sharper edges in cutting processes, and avoiding unwanted tissue damage during sculpting processes. Lasers producing deep ultraviolet wavelengths are therefore desirable for use in a number of medical applications, such as laser surgery, corneal sculpting or ophthalmic surgery.

Laser systems producing deep ultraviolet wavelengths are also well-suited to photolithography applications. Many semiconductor manufacturers use, or plan to use, ultraviolet lasers in illuminating photoresist to etch semiconductor patterns onto a wafer. Wavelengths less than 213 nm are needed to enable the production of semiconductor devices having feature sizes beneath 0.25 microns. The design of laser systems for semiconductor applications is further complicated by the need to provide lasers producing a relatively high average power at deep ultraviolet wavelengths.

Repetition rates of 500 Hz to over 20 kHz are now desired for both photolithography and corneal sculpting applications. At the average power level needed for these applications, and at these high repetition rates, the energy per pulse should be low. For example, photolithography and corneal sculpting applications at 193 nm wavelengths call for an average power of several watts, or less than 1 mJ per pulse at desirable repetition rates of greater than 10 kHz. Pulse energies less than or equal to 1 mJ are difficult, if not impossible to produce with acceptable efficiency using previous devices. Thus, there is also a need for a process and apparatus for efficiently producing low energy per pulse ultraviolet radiation suitable for semiconductor processing and medical applications.

Currently, excimer lasers are used to produce ultraviolet wavelength beams. State of the art excimer lasers include KrF and ArF devices which primarily emit beams in the ultraviolet spectral region, with principle transitions at, e.g., 248 and 193 nm. Unfortunately, excimer lasers are expensive and also suffer from high maintenance costs resulting from contamination generated in the laser discharge. This requires frequent gas servicing and reduces the lifetime of the laser chamber. Optics must be cleaned and replaced with relative frequency. Further, these excimer lasers generally do not permit tuning. That is, the lasers are limited to use at specific wavelengths (e.g., 193 or 248 nm). Excimer lasers producing ultraviolet wavelengths also suffer from damage to the optics resulting from the inability of excimer lasers to produce pulses at repetition rates greater than about 1 kHz. As a consequence, each pulse has high energy and peak power, resulting in decreased optics life.

The need for coherent ultraviolet lasers has led those in the medical and semiconductor industries to rely on excimer lasers, despite their shortcomings. Semiconductor manufacturers have begun optimization of photoresists for 193 nm wavelengths produced by excimer lasers. Excimer lasers operating at about 193 nm are also currently used for corneal ablation and other surgical applications. Thus, it is desirable to provide lasers capable of producing deep ultraviolet wavelengths, which do not suffer from the shortcomings of excimer lasers and which may be integrated into existing medical, diagnostic, and semiconductor equipment.

Solid state lasers have a number of desirable characteristics. For example, these lasers provide the ability to increase power using higher repetition rates than are possible using excimer lasers. Solid state lasers also generally cost less and have a longer useful life than excimer lasers. Unfortunately, however, these lasers have not been able to provide the highly coherent deep ultraviolet radiations needed for ophthalmic surgery, semiconductor processing, or diagnostic applications.

Several groups have described attempts to produce cost effective solid state lasers generating beams in the ultraviolet spectrum. For example, Lin, in U.S. Pat. No. 5,144,630 issued Sep. 1, 1992, describe wavelength conversion of solid state lasers to generate ultraviolet harmonics near 266 nm and 213 nm. Borsuztky et al., in "Tunable UV Radiation at Short Wavelengths (188–240 nm) Generated by Sum Frequency Mixing in Lithium Borate" report optical sum frequency generation which mixes the fifth harmonic (near 213 nm) of a Nd:YAG laser with the output from a beta barium borate (BBO) optical parametric oscillator in a lithium triborate (LBO) sum frequency generator.

Each of these approaches, however, suffers in that they have low optical conversion efficiency. The low efficiency results in an inability to provide deep ultraviolet beams having sufficient power to replace excimer lasers in most applications. The Borsuztky et al. device suffers from low efficiency resulting from the use of a BBO optical parametric oscillator to generate long wavelength (1.2 to 2.6 microns) power to frequency mix with harmonics to obtain 188–242 nm power. The BBO optical parametric oscillator has a large energy per pulse threshold that takes most of the input power when small output pulse energies are needed. This problem results from the relatively low nonlinear drive in BBO and strong walk-off effects that shorten the effective nonlinear interaction length. As a result, the approach described by Borsuztky is not suitable for low pulse energy sources used in photolithography, corneal sculpting, or ophthalmic surgery.

U.S. Pat. No. 5,144,630 to Lin discusses UV sources with wavelengths greater than 210 nm. The use of BBO to obtain the fifth harmonic of 1 micron lasers results in reduced efficiencies due to strong walk-off when low energy per pulse devices are required. Further, the use of BBO (in both the Lin and Borsuztky references) results in the production of complex wavelength converters incapable of providing low pulse energies with good efficiency and beam quality. The strong walk-off in BBO requires additional optical elements such as cylindrical lenses (Lin) and waveplates (Borsutzky) to obtain the correct polarization staging, beam overlap, and reasonable efficiency.

Accordingly, there is a need for a solid state laser system capable of producing coherent radiations at deep ultraviolet wavelengths with high efficiency and low pulse energies. Preferably, the system produces deep ultraviolet wavelengths without the need for additional optical elements.

SUMMARY OF THE INVENTION

According to the invention, a solid state laser system producing coherent radiations at deep ultraviolet wavelengths includes a solid state laser producing a first beam having a wavelength near 1 micron. The 1 micron beam is passed to both a harmonic generation stage and to a tunable optical parametric oscillator. The harmonic generation stage is configured to produce a fifth harmonic of the 1 micron beam, while the optical parametric oscillator produces a tunable beam in the near infrared spectrum (e.g., approximately 2.075 micron). The fifth harmonic and the near infrared beams are mixed in a sum frequency generator to produce a highly coherent beam in the deep ultraviolet (e.g., between approximately 180 nm to 213 nm).

In one embodiment of the present invention, cesium lithium borate (CLBO) non-linear crystals are used in the harmonic generation stage, while the optical parametric oscillator uses periodic poled lithium niobate (PPLN).

Further embodiments of the present invention employ different configurations of harmonic generation stages to generate fifth harmonic radiations which are then sum frequency mixed with near infrared radiations from the optical parametric oscillator to produce deep ultraviolet beams. Generation of the fifth harmonic, according to embodiments of the invention, is performed using non-linear crystals oriented to minimize walkoff, thereby providing good spatial overlap and increased efficiency.

Embodiments of the present invention permit the efficient generation of highly coherent deep ultraviolet beams (between about 193 and 213 nm) at high pulse repetition rates (greater than about 1 kHz), with low pulse energy, and generating relatively large average power (greater than about 1 Watt). Spectral characteristics of the output beam are tunable using optical elements in the near infrared, thereby improving system reliability.

For a fuller understanding of the nature and advantages of the invention, reference should be made to the ensuing description taken in conjunction with the accompanying drawings.

DESCRIPTION OF THE PREFERRED EMBODIMENT

Embodiments of the present invention will now be described by first referring to FIG. 1A, where a solid state laser system 10 producing an output beam in the deep ultraviolet spectrum is shown. The system 10 includes a pulsed solid state laser 12 outputting a beam to a beam splitter 14 which passes the split beam to an optical parametric oscillator 16 and to a harmonic generation stage 18. Beams from optical parametric oscillator 16 and harmonic generation stage 18 are combined in a sum frequency generator 28 to generate a deep ultraviolet wavelength output beam.

In one specific embodiment, solid state laser 12 is a 40 Watt diode pumped Nd:YAG laser that is Q-switched and cavity dumped to provide a short pulse at 10 kHz rep-rates, producing a beam having a wavelength of approximately 1 micron. In a currently-preferred embodiment, laser 12 produces a fundamental beam having a wavelength of about 1.064 micron. Alternatively, solid state laser 12 may be formed using other host crystals and glasses known in the art, such as Nd:YLF, Yb:YAG, or Yb:S-FAP. Throughout the remainder of this specification, wavelengths discussed will be based upon the use of a Nd:YAG laser producing a 1.064 micron beam. Those skilled in the art will recognize that the use of other host crystals and glasses will result in the production of beams having other similar wavelengths.

The near 1 micron beam produced by laser 12 is passed to both an optical parametric oscillator 16 and to a harmonic generation stage 18. Optical parametric oscillator 16, in one specific embodiment, uses periodic poled lithium niobate ($LiNbO_3$, hereinafter referred to as PPLN) to generate near infrared radiation at approximately 2 microns, preferably at about 2.075 microns. This non-linear material is quasi-phasematched, thereby eliminating any walkoff. The result is an improved conversion efficiency of low energy laser pulses as compared to critically phasematched or non quasi-phasematched non-linear materials. The very low threshold of the PPLN optical parametric oscillator requires a small fraction of the energy from the solid state laser 12, thereby leaving most of the power for use in the harmonic generation stage 18 and in the sum frequency generator 28.

Further, the quasi-phasematching used in the PPLN oscillator provides a high degree of flexibility in the infrared mixing wavelength, providing a degree of tunability in the generated deep ultraviolet wavelength from the sum frequency generator 28. In particular, the output wavelength of the PPLN optical parametric oscillator 16 according to the invention may be tuned approximately ±2 nm by making slight angle or temperature variations. Greater tuning variations may be accomplished by providing optional wavelength control modules 13 and 17 coupled to modify the wavelength of the solid state laser 12 and the optical parametric oscillator 16. Tuning permits adjustment between about 1.5 to 2.1 microns from the output of optical parametric oscillator 16.

The use of a PPLN optical parametric oscillator helps embodiments of the present invention achieve the production of deep ultraviolet radiations operating in the 193 to 213 nm range at high repetition rates and small pulse energies. Previous optical parametric oscillators, using critically phasematched non-linear materials such as KTP, KTA, or BBO suffered from strong walk-off effects and conversion inefficiencies. Noncritical phasematched materials such as KTP and KTA also have high thresholds due to their non-linear drive. Prior optical parametric oscillators have thresholds of approximately 2 mJ. The strong walk-off effects and/or low non-linear drive tend to increase the threshold. Thus, optical parametric oscillators in previous devices would require 20 watts, at 10 kHz of 1 micron power, just to reach threshold.

In contrast, embodiments of the present invention employ quasi-phasematched non-linear materials in the optical parametric oscillator. These non-linear materials have optical parametric oscillator thresholds approximately 100 times lower than previous materials. Decreased optical parametric oscillator thresholds are achieved by increasing the available non-linearity and by providing conversion with substantially no walk-off effects over a broad wavelength range. With an optical parametric oscillator threshold 100 times lower only tens of microjoules at 1 micron are needed to reach threshold. This becomes an insignificant part of the 1 micron source energy, and the overall efficiency of the disclosed deep ultraviolet source becomes a factor of two or more larger. The use of PPLN or other quasi-phasematched materials (such as RTA, RTP, GaAs, KTA, KTP or LiTaO$_3$) to provide the near-infrared to mid-infrared power for mixing with 1 micron harmonics to reach the deep ultraviolet helps provide an efficient and cost acceptable source for applications such as photolithography, corneal sculpting, and ophthalmic surgery.

Tuning the spectral characteristics of the optical parametric oscillator 16 results in tuning of the output characteristics of the system. Controlling the spectral characteristics at the near infrared (the wavelength at which the optical parametric oscillator 16 operates) enables the use of more durable optical gratings, mirrors, etalons, and other optical elements than was possible in previous devices because infrared wavelengths are not as destructive as ultraviolet wavelengths. This results in the ability to produce a more reliable and cost effective system.

Optical parametric oscillator 16 may be formed in any of a number of configurations known to those skilled in the art, so long as the crystal used in the optical parametric oscillator is a non-linear quasi-phasematched material. For example, optical parametric oscillator 16 may be a linear-cavity optical parametric oscillator or a ring-cavity optical parametric oscillator.

Harmonic generation stage 18 is formed from a number of nonlinear crystals to produce a fifth harmonic of the beam generated by solid state laser 12. In a currently preferred embodiment, harmonic generation stage 18 includes a frequency doubler 20, a fourth harmonic generator 22, and a fifth harmonic generator 24.

In one embodiment, frequency doubler 20 is formed from Type I non-critically phasematched lithium triborate (LBO) nonlinear crystal chosen to frequency double the 1.064 micron Nd:YAG pump output to generate a frequency doubled wavelength at 532 nm. The LBO, preferably, is maintained at 150° C. While LBO is a currently preferred material (due to its ability to handle high average power), other materials such as critically phasematched KTA or periodic poled lithium niobate (PPLN) or periodic poled lithium tantalate (PPLT) may also be used, as long as the doubled wavelength has good beam quality.

The second harmonic generated by frequency doubler 20 is passed to a fourth harmonic generator 22. Preferably, fourth harmonic generator 22 is formed from a cesium lithium borate (CLBO) nonlinear crystal which is critically phasematched as a Type I where the ordinary waves are the second harmonic (near 532 nm) and the extraordinary wave is the fourth harmonic (near 266 nm). The CLBO crystal may be angle cut at about 61.5°. This embodiment of fourth harmonic generator 22 has a relatively high conversion efficiency compared to previous fourth harmonic generators (e.g., those using BBO). For example, for a crystal length of 0.5 cm, at an incident energy at 532 nm of 2.6 mJ, generator 22 has an efficiency above about 35%. This efficiency increases to above approximately 70% at a crystal length of 1.5 cm. Further, the fourth harmonic generator 22 has a low walkoff angle (approximately 33 mrad compared to 84 mrad for BBO), a relatively large angular acceptance of approximately 0.48 mrad-cm (compared to 0.12 mrad-cm for BBO), and a relatively large temperature acceptance of approximately 10° C.-cm.

The fourth harmonic generated by fourth harmonic generator 22 is passed to a fifth harmonic generator 24. In one embodiment, fifth harmonic generator 24 is formed from a CLBO nonlinear crystal which is critically phasematched as a Type I where the ordinary waves are the unconverted pump wavelength (near 1 micron, and in this specific embodiment using an Nd:YAG source, is approximately 1.064 micron) and the fourth harmonic (near 266 nm). The extraordinary wave is the fifth harmonic (near 213 nm). The CLBO crystal may be angle cut at about 64.8°. The fifth harmonic generator has a relatively high conversion efficiency compared to previous fifth harmonic generators (e.g., those using BBO), and also enjoys a low walkoff angle (approximately 33 mrad compared to 93 mrad for BBO), a relatively large angular acceptance (e.g., approximately 0.37 mrad-cm compared to 01.2 mrad-cm for BBO), and a good temperature acceptance (e.g., approximately 10° C.-cm).

In an alternative embodiment, fifth harmonic generator 24 is formed from a CLBO nonlinear crystal angle cut at about 79.2° which is Type II phasematched, where one of the input waves is polarized as a extraordinary wave, the second input wave is polarized as an ordinary wave, and the fifth harmonic wave is polarized as an extraordinary wave. Although this embodiment exhibits a slightly smaller conversion efficiency than the embodiment using Type I phasematched CLBO, this embodiment does exhibit a larger angular acceptance (e.g., approximately 0.92 mrad-cm), and a walkoff angle of approximately 16 mrad.

Unlike previous solid state lasers operating in the ultraviolet, embodiments of the present invention permit the efficient generation of fourth and fifth harmonics while minimizing the effects of walkoff or conversion efficiency.

The fifth harmonic (e.g., approximately 213 nm) is passed to a sum frequency generator 28 where it is mixed with the near infrared radiation provided from the optical parametric oscillator 16. In a first specific embodiment, sum frequency generator 28 is formed from a CLBO nonlinear crystal phasematched in either Type I or Type II. In both Type I and Type II phasematching of a CLBO nonlinear crystal, the sum frequency generator 28 exhibits relatively large temperature acceptance of about 10° C.-cm, a walk-off angle of approximately 45 mrad and an angular acceptance of 0.27 mrad-cm. The result is improved power scaling properties over previous devices (e.g., those using BBO). The large temperature acceptance of the CLBO material also provides improved performance in applications where heating of the sum frequency generator 28 would occur, such as in cases where shorter wavelengths are desired (e.g., sub-200 nm), and result in heating of the crystal due to bulk absorption. Similar heating can occur in applications which require larger average power. The relatively large temperature acceptance of the Type I or Type II phasematched CLBO nonlinear crystal in sum frequency generator 28 provides improved performance in these situations.

In an alternative embodiment, sum frequency generator 28 is formed from an LBO nonlinear crystal. LBO is a bi-axial crystal which will phasematch at deep ultraviolet wavelengths in the XY and YZ planes. In an embodiment phasematched in the XY plane, sum frequency generator 28 has a smaller temperature acceptance of about 3.84° C.-cm, a walkoff angle of about 25 mrad, and a larger angular acceptance (about 0.5 mrad-cm) than the embodiment using a CLBO crystal. Alternatively, to further improve the angular acceptance and to reduce or eliminate walkoff, the LBO crystal may be phasematched in the YZ plane. As the temperature acceptance of the sum frequency generator 28 is reduced when LBO crystal is used, this embodiment is preferred for use in lower average power applications, or for shorter deep ultraviolet wavelengths.

Figure 1A:
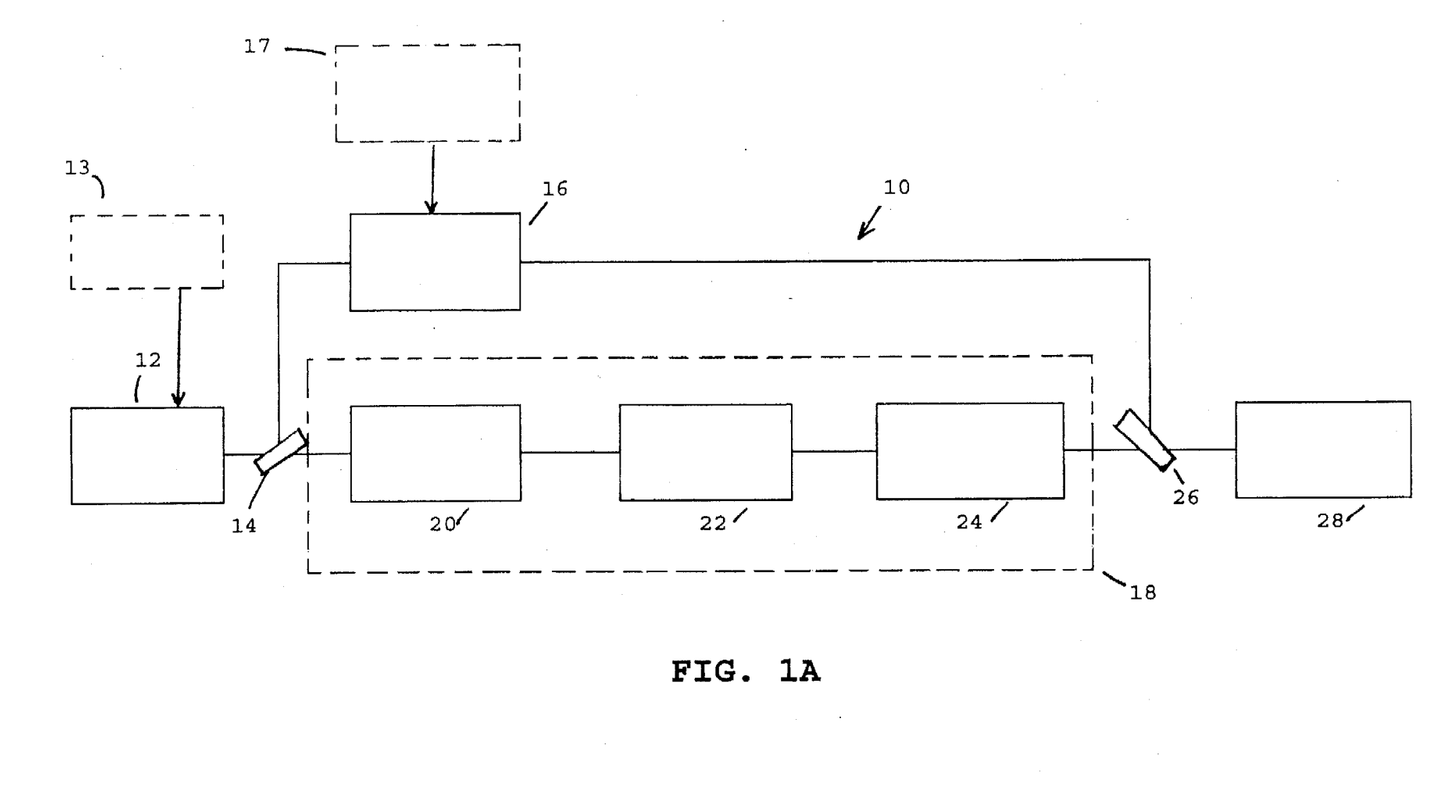
FIG. 1A is a block diagram depicting one embodiment of a tunable pulsed solid state laser operating in the deep ultraviolet spectrum.
Figure 1B:
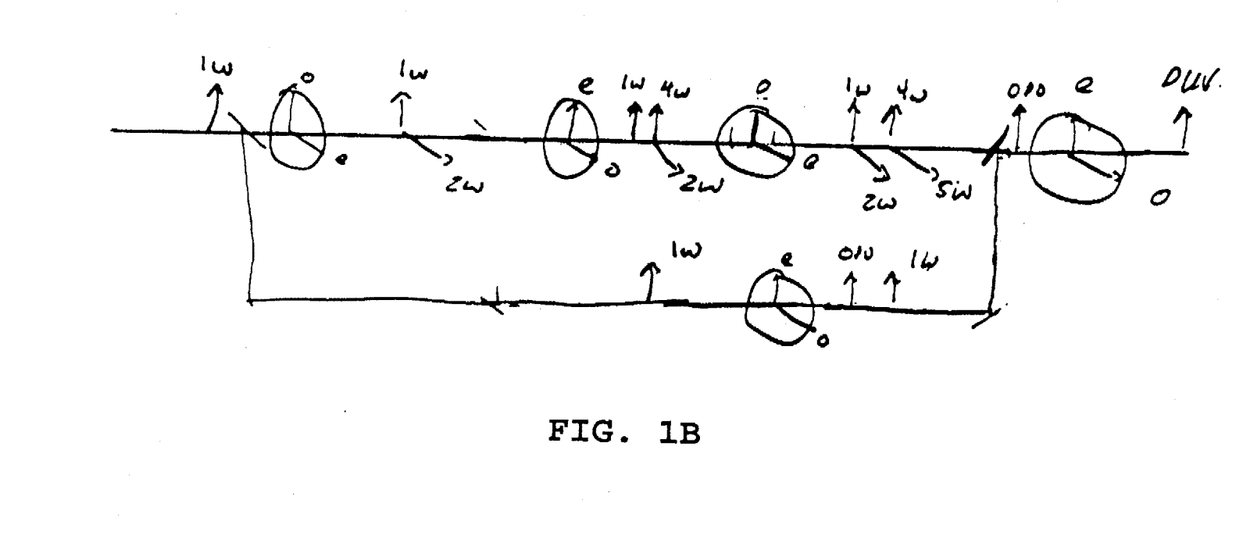
FIG. 1B is a schematic diagram of the polarization directions of the fundamental and harmonic beams associated with the laser of FIG. 1A.

Referring now to FIG. 1B, a schematic diagram depicting the polarization directions of the laser system 10 of FIG. 1A is shown. The schematic diagram of FIG. 1B depicts the polarization for the case where the fifth harmonic generator 24 is formed from a CLBO nonlinear crystal which is critically phasematched as a Type I, and where sum frequency generator 28 is formed from a CLBO nonlinear crystal. As shown in the polarization schematic, embodiments of the present invention orient a combination of nonlinear crystals such that the walkoff directions overlap each other, providing good spatial overlap in the presence of walkoff. The result is a device which requires no polarization "flipping" optical elements, and which, generally, requires no beam shaping or other walkoff compensation elements, thereby optimizing performance, efficiency, and simplicity of the laser system 10. In an embodiment where an LBO crystal is used for the sum frequency generator 28, a single rotator may be used in the optical parametric oscillator 16 to orient the output of the oscillator in the ordinary direction for the LBO crystal.

The solid state laser system 10 of FIG. 1A permits the efficient generation of highly coherent deep ultraviolet beams at high pulse repetition rates and with low pulse energy. Spectral characteristics of the output beam are tunable using optical elements in the near infrared, thereby improving system reliability as compared to lasers that must wavelength tune the ultraviolet wavelength directly.

In one further embodiment of the present invention, the harmonic generation stage 18 of laser system 10 is formed using a third harmonic generator rather than the above-described fourth harmonic generator 22. In this embodiment, a third harmonic generator is provided between the second harmonic generator 20 and the fifth harmonic generator 24, and is formed from a CLBO nonlinear crystal which is critically phasematched as a Type I where the ordinary waves are the second harmonic (near 532 nm) and the source beam (near 1 micron), to produce a third harmonic. The fifth harmonic generator 24 then receives both the third harmonic and the second harmonic to produce a fifth harmonic as before. This embodiment of the harmonic generation stage 18 also results in the orientation of the extraordinary and ordinary polarizations such that spatial overlap can be optimized. The stage is optimized for the effects of walkoff in the multiple nonlinear stages, resulting in the production of a highly coherent output beam in the deep ultraviolet, suitable for a wide range of applications.

Figure 2:
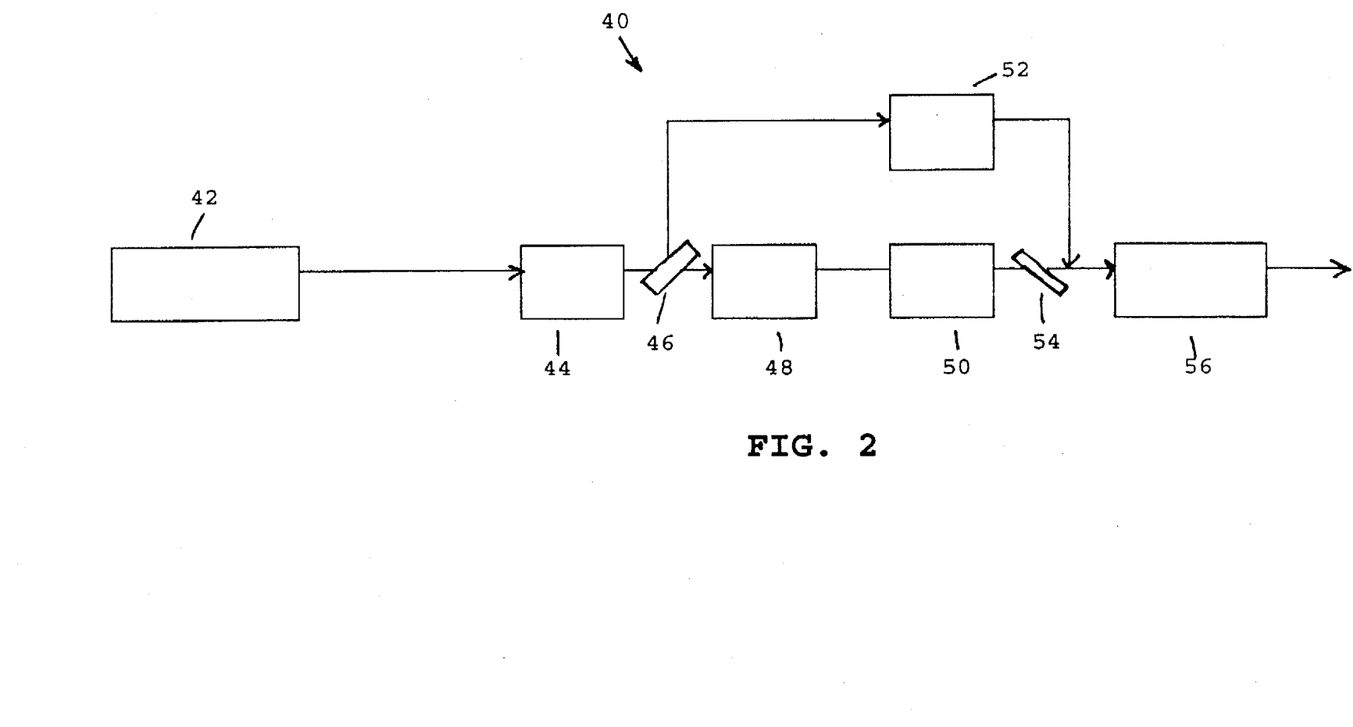
FIG. 2 is a block diagram depicting a further embodiment of a tunable pulsed solid state laser operating in the deep ultraviolet spectrum.

Referring now to FIG. 2, a laser system 40 is shown incorporating features of the present invention. System 40 includes a laser source 42, second harmonic generator 44, beam splitters 46, 54, fourth harmonic generator 48, fifth harmonic generator 50, optical parametric oscillator 52, and a sum frequency generator 56. As in the embodiment of FIG. 1A, system 40 produces a highly coherent deep ultraviolet output beam from an input beam of approximately 1 micron. Each of the elements of system 40 may be formed as in the embodiment of FIG. 1A, with the exception that the optical parametric oscillator 52 receives the output of second harmonic generator 44. The very low threshold of the PPLN optical parametric oscillator 52 requires a small fraction of the energy from the second harmonic generator 44 and the laser 42, thereby leaving most of the power for use in the generation of the fifth harmonic and for use in sum frequency generator 56.

Figure 3:
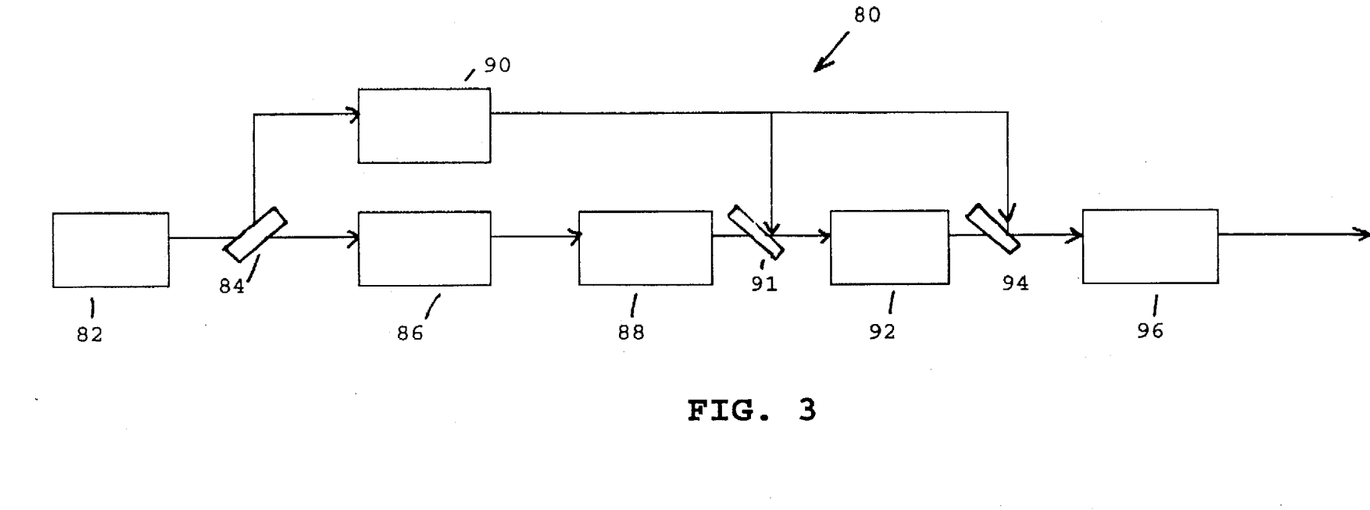
FIG. 3 is a block diagram depicting a further embodiment of a tunable pulsed solid state laser operating in the deep ultraviolet spectrum.

Referring now to FIG. 3, a further embodiment of a laser system 80 is shown incorporating features of the present invention. System 80 includes a laser source 82, a second harmonic generator 86, a number of beam splitters 84, 91, 94, a fourth harmonic generator 88, an optical parametric oscillator 90, and a pair of sum frequency generators 88, 92. As in the embodiment of FIG. 1A, system 80 produces a highly coherent deep ultraviolet output beam from an input beam of approximately 1 micron. Each of the elements of system 80 may be formed as in the embodiment of FIG. 1A, with the exception that the elements 86, 88 result in the production of a fourth harmonic, and sum frequency generator 92 mixes the output of the optical parametric oscillator 90 with the output of harmonic generation elements 86 and 88. Sum frequency generator 96 re-mixes the output of sum frequency generator 92 with the output of optical parametric oscillator 90. In the preferred embodiment of this configuration, the pump laser 82 operates near 1 micron, the optical parametric oscillator 90 produces an output near 1.4 micron, the output from sum frequency generator 92 is near 0.22 microns, and the output of the second sum frequency generator 96 is near 0.19 microns.

One advantage of this configuration is that sum frequency generator 92, the crystal which sum frequency mixes the fourth harmonic beam with an infrared beam to produce a shorter-wavelength beam, may be an LBO crystal. In some situations, LBO may be a preferred material for producing shorter wavelengths by mixing fourth-harmonic beams with infrared beams due to LBO's excellent ultraviolet transparency.

Figure 4A:
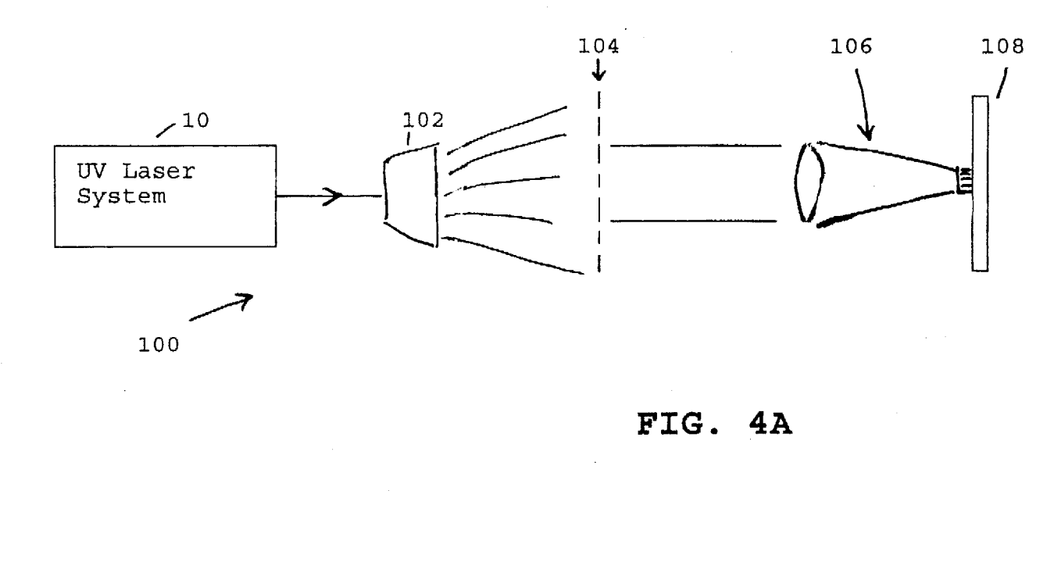
FIGS. 4A–D are block diagrams depicting different application environments for the laser system of the present invention.

Embodiments of the present invention are well-suited to use in photolithography, surgical, and diagnostic applications. Referring now to FIG. 4A, a semiconductor processing apparatus 100 is shown using a ultraviolet laser system 10 according to the present invention. The apparatus 100 projects a deep ultraviolet beam from laser 10 through an illuminator 102 on a lithography mask 104. Light allowed past mask 104 is projected onto a resist-coated wafer 108 using a projection lens system 106.

Figure 4B:
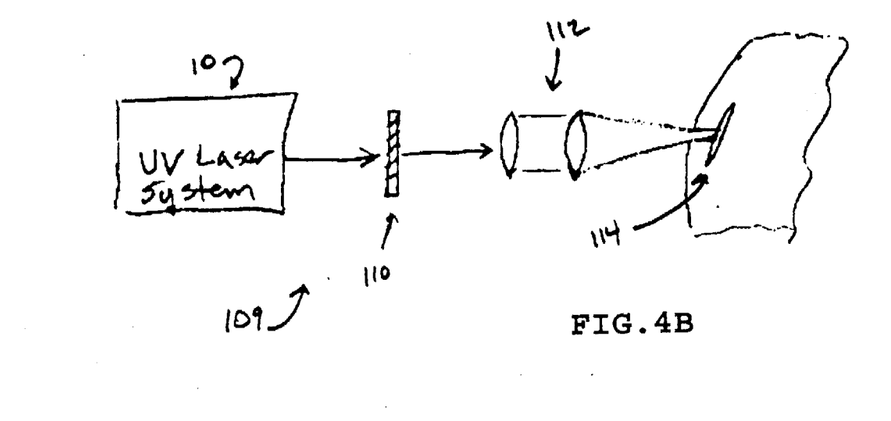
Figure 4C:
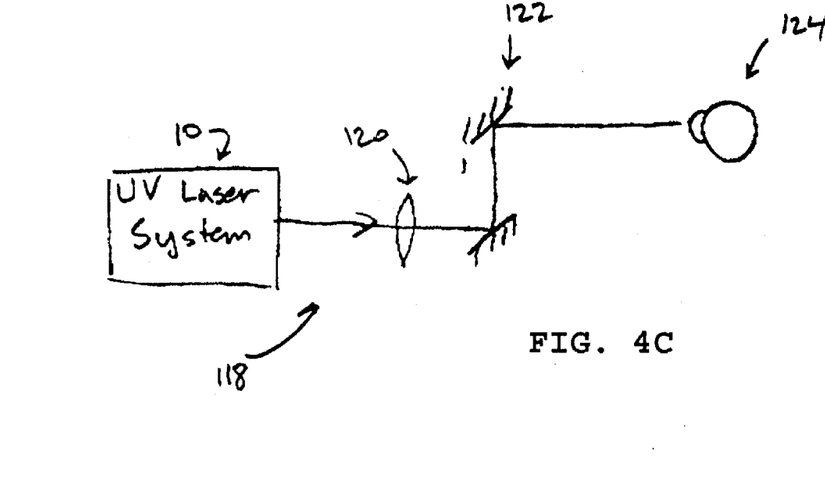

FIG. 4B depicts a laser surgery apparatus 109 used for the ablation or cutting of tissue. Apparatus 109 employs an ultraviolet laser system 10 according to the invention to project deep ultraviolet light through a shutter 110 and through beam delivery optics 112 onto a tissue site 114. FIG. 4C depicts a further laser surgery apparatus 118 used for corneal shaping or sculpting operations. In this embodiment, apparatus 118 employs ultraviolet laser system 10 to focus a deep ultraviolet beam onto beam shaping optics 120 and through scanning mirrors 122 onto an eye 124 for a desired operation.

Figure 4D:
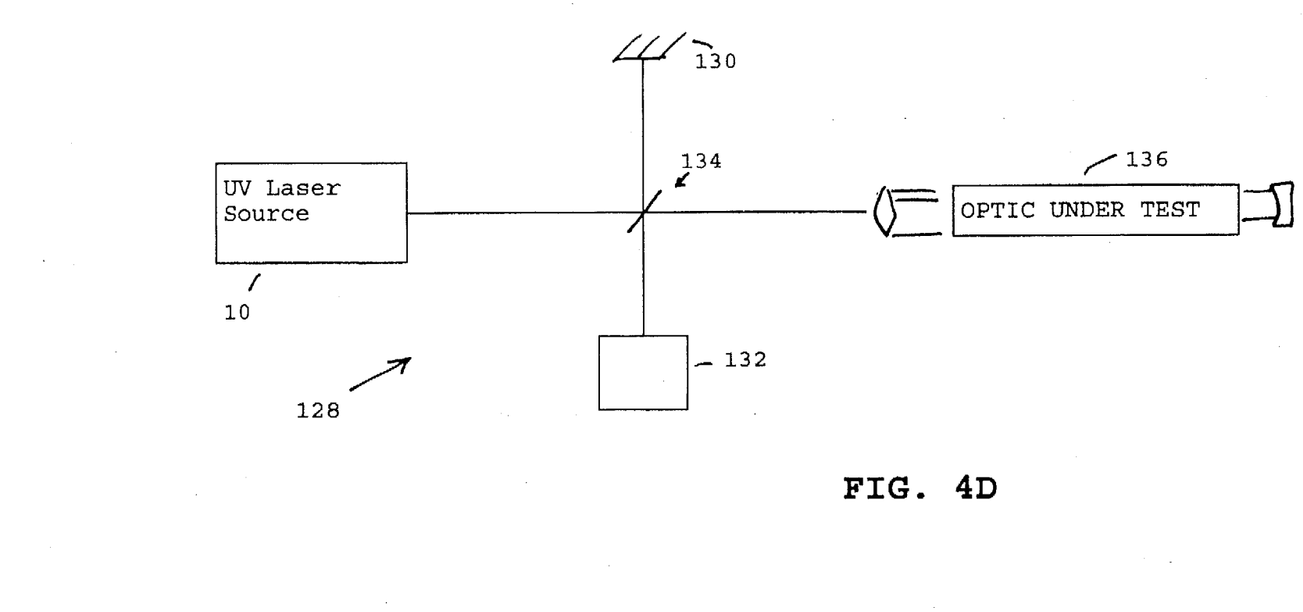

FIG. 4D depicts a further application for which the ultraviolet laser system 10 according to the invention is suited. A diagnostic system 128 employs a reference mirror 130, a beamsplitter 134 and a camera 132 to perform diagnostic operations on an optic under test 136. Each of the applications shown in FIGS. 4A–D require the use of deep ultraviolet wavelengths of, e.g., 193 nm having relatively high repetition rates (greater than about 1 kHz) and relatively high average power (greater than about 1 Watt). Thus, embodiments of the present invention are well-suited for use in each of the above application environments.

As will be appreciated by those familiar with the art, the present invention may be embodied in other specific forms without departing from the spirit or essential characteristics thereof. For example, while a single pumping laser 12 is depicted in the embodiment of FIG. 1, two separate pumping lasers may be employed to provide beams to the optical parametric oscillator 16 and to the harmonic generation stage 18. Further, optical parametric oscillator 16 may be formed from a laser source adapted to produce a desired wavelength for mixing in sum frequency generator 28.

Accordingly, the disclosure of the invention is intended to be illustrative, but not limiting, of the scope of the invention which is set forth in the following claims.

What is claimed is:

1. A laser system comprising:
   a solid state laser adapted to produce a first beam having a first wavelength;
   a harmonic generation stage, coupled to receive said first beam, for producing a second beam having a second wavelength;
   a tunable optical parametric oscillator, coupled to receive said first beam, for producing a third beam having a third wavelength; and
   a sum frequency mixer, coupled to receive said second beam and said third beam to produce a fourth beam having a fourth wavelength, said fourth wavelength between about 180–213 nm.

2. The laser system of claim 1, wherein said first wavelength is approximately 1 micron.

3. The laser system of claim 1, wherein said solid state laser is a 40 Watt Nd:YAG laser, said first beam is a short pulse at 10 kHz repetition rates, and wherein said fourth beam has an average power of greater than about 1 Watt.

4. The laser system of claim 1, wherein spectral properties of said fourth beam are controlled by controlling spectral properties of said first beam and said third beam.

5. The laser system of claim 1, said harmonic generation stage further comprising:
   a first non-linear crystal for generating a second harmonic of said first beam;
   a second non-linear crystal, coupled to receive said first beam and said second harmonic of said first beam, for generating a fourth harmonic of said first beam; and
   a third non-linear crystal, coupled to receive said first beam and said fourth harmonic of said first beam, for generating a fifth harmonic of said first beam.

6. The laser system of claim 5, wherein said second and third non-linear crystals are cesium lithium triborate (CLBO) crystals.

7. The laser system of claim 5, wherein said first non-linear crystal comprises a periodic poled non-linear material.

8. The laser system of claim 5, wherein said first, second, and third non-linear crystals are oriented to match the walkoff axis to maintain spatial overlap into each subsequent non-linear crystal.

9. The laser system of claim 1, said harmonic generation stage further comprising:
   a first non-linear crystal for generating a second harmonic of said first beam;
   a second non-linear crystal, coupled to receive said first beam and said second harmonic of said first beam, for generating a third harmonic of said first beam; and
   a third non-linear crystal, coupled to receive said second harmonic and said third harmonic of said first beam, for generating a fifth harmonic of said first beam.

10. The laser system of claim 9, wherein said first non-linear crystal comprises a periodic poled non-linear material.

11. The laser system of claim 1, wherein said tunable optical parametric oscillator includes a periodic poled non-linear crystal and said third wavelength is an infrared wavelength tunable from approximately 1400 to 3300 nm.

12. The laser system of claim 1, wherein said tunable optical parametric oscillator includes a quasi-phasematched periodically poled non-linear crystal having no walkoff.

13. The laser system of claim 1, wherein said tunable optical parametric oscillator includes a non-critically phasematched non-linear crystal having no walkoff.

14. The laser system of claim 1, wherein said sum frequency mixer includes a CLBO crystal.

15. The laser system of claim 1, wherein said sum frequency mixer includes a LBO crystal.

16. The laser system of claim 5, wherein the birefringent phasematching of said third crystal are set such that said first beam and said fourth harmonic of said first beam have an ordinary polarization.

17. A method for generating a deep ultraviolet wavelength from an input beam having a wavelength of approximately one micron, the method comprising the steps of:
   generating, in a harmonic conversion stage, a second beam having a fifth harmonic of said input beam, said harmonic conversion stage formed from at least first and second CLBO non-linear crystals oriented to compensate for walkoff;
   generating, in a tunable optical parametric oscillator, a third beam having a wavelength of approximately 2 microns, said tunable optical parametric oscillator including a periodically poled non-linear crystal; and
   mixing, in a sum frequency generator, said fifth harmonic of said input beam and said third beam to generate a deep ultraviolet wavelength output beam.

18. The method of claim 17, wherein said deep ultraviolet wavelength output beam has an average power of greater than about 1 Watt.

19. An apparatus for performing an operation using a deep ultraviolet wavelength beam, the apparatus comprising:
   an ultraviolet laser system comprising
   a laser source producing an input beam having a wavelength of about 1 micron;
   a harmonic generation stage, coupled to receive said input beam, for producing a fifth harmonic of said input beam;
   a tunable optical parametric oscillator formed from a non-linear crystal coupled to receive said input beam and to produce an infrared beam;
   a sum frequency generator coupled to mix said near-infrared beam and said fifth harmonic of said input beam to produce said deep ultraviolet output beam; and
   output means, for applying said deep ultraviolet output beam to perform said operation.

20. The apparatus of claim 19, wherein said operation is laser surgery, and wherein said output means further comprises a shutter and beam delivery optics to apply said deep ultraviolet output beam to a selected tissue site.

21. The apparatus of claim 19, wherein said operation is corneal sculpting, and wherein said output means further comprises beam shaping optics coupled to scanning mirrors for focussing said deep ultraviolet output beam to a corneal site.

22. The apparatus of claim 19, wherein said operation is photolithography, and wherein said output means further comprises an illuminator coupled to focus said deep ultraviolet output beam onto a resist coated wafer through a mask.

23. The apparatus of claim 19, wherein said operation is a diagnostic operation, and wherein said output means further comprises a camera and a reference mirror coupled to focus said deep ultraviolet output beam onto an item under test.

24. A method for generating a deep ultraviolet wavelength from an input beam having a wavelength of approximately one micron, the method comprising the steps of:
   generating, in a harmonic conversion stage, a second beam having a fourth harmonic of said input beam, said harmonic conversion stage formed from at least a first CLBO non-linear crystal oriented to compensate for walkoff;

generating, in a tunable optical parametric oscillator, a third beam having a wavelength of approximately 1.2 to 1.6 microns, said tunable optical parametric oscillator including a periodically poled non-linear crystal;

mixing, in a first sum frequency generator, said fourth harmonic of said input beam and said third beam to generate a fourth beam; and mixing, in a second sum frequency generator, said fourth beam and said third beam to generate a deep ultraviolet output beam.

25. The method of claim 24, wherein said deep ultraviolet wavelength output beam has an average power of greater than about 1 Watt.

26. The method of claim 24, wherein said first and second sum frequency generators include LBO non-linear crystals.

27. A laser system, comprising:

a solid state laser adapted to produce a first beam having a first wavelength near 1 micron;

a first non-linear crystal for generating a second harmonic of said first beam;

a first CLBO non-linear crystal, coupled to receive said first beam and said second harmonic of said first beam, for generating a fourth harmonic of said first beam; and a second CLBO non-linear crystal, coupled to receive said first beam and said fourth harmonic of said first beam, for generating a fifth harmonic of said first beam.

* * * * *